United States Patent
Keysers et al.

(10) Patent No.: US 10,185,872 B2
(45) Date of Patent: Jan. 22, 2019

(54) PARTIAL OVERLAP AND DELAYED STROKE INPUT RECOGNITION

(71) Applicant: Google LLC, Mountain View, CA (US)

(72) Inventors: Daniel M. Keysers, Stallikon (CH); Thomas Deselaers, Zurich (CH); Henry Allan Rowley, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 140 days.

(21) Appl. No.: 14/967,901

(22) Filed: Dec. 14, 2015

(65) Prior Publication Data

US 2016/0098595 A1    Apr. 7, 2016

Related U.S. Application Data

(63) Continuation of application No. 14/107,007, filed on Dec. 16, 2013, now Pat. No. 9,224,038.

(51) Int. Cl.
*G06K 9/00* (2006.01)
*G06K 9/52* (2006.01)

(52) U.S. Cl.
CPC .......... *G06K 9/00422* (2013.01); *G06K 9/00* (2013.01); *G06K 9/00402* (2013.01); *G06K 9/00865* (2013.01); *G06K 9/52* (2013.01); *G06K 2209/01* (2013.01)

(58) Field of Classification Search
None
See application file for complete search history.

(56) References Cited

U.S. PATENT DOCUMENTS

| 5,392,363 A | 2/1995 | Fujisaki |
| 5,768,417 A * | 6/1998 | Errico ................ G06K 9/00865 382/122 |
| 7,394,934 B2 | 7/2008 | Guha |
| 2002/0071607 A1 * | 6/2002 | Kawamura ............ G06K 9/222 382/187 |
| 2005/0100218 A1 | 5/2005 | Guha |
| 2005/0175242 A1 * | 8/2005 | Tanaka ................... G06K 9/222 382/187 |
| 2006/0103859 A1 * | 5/2006 | Duncan ................... G06K 9/222 358/1.8 |

(Continued)

FOREIGN PATENT DOCUMENTS

WO    2012/024829    3/2012

OTHER PUBLICATIONS

Arica, Nafiz, and Fatos T. Yarman-Vural. "Optical character recognition for cursive handwriting." IEEE Transactions on Pattern Analysis and Machine Intelligence 24.6 (2002): 801-813. 13 pages.*

(Continued)

*Primary Examiner* — Ryan P Potts
(74) *Attorney, Agent, or Firm* — Fish & Richardson P.C.

(57) ABSTRACT

An optimal recognition for handwritten input based on receiving a touch input from a user may be selected by applying both a delayed stroke recognizer as well as an overlapping recognizer to the handwritten input. A score may be generated for both the delayed stroke recognition as well as the overlapping recognition and the recognition corresponding to the highest score may be presented as the overall recognition.

9 Claims, 12 Drawing Sheets

(56) References Cited

U.S. PATENT DOCUMENTS

| | | | | |
|---|---|---|---|---|
| 2006/0210173 A1* | 9/2006 | Jurion | ............... | G06K 9/00436 |
| | | | | 382/229 |
| 2007/0286486 A1* | 12/2007 | Goldstein | .......... | G06K 9/00422 |
| | | | | 382/187 |
| 2008/0306737 A1* | 12/2008 | Johnston | ................. | G06F 3/017 |
| | | | | 704/235 |
| 2009/0208107 A1* | 8/2009 | Suwa | ..................... | G06K 9/344 |
| | | | | 382/187 |
| 2012/0232904 A1* | 9/2012 | Zhu | ........................ | G10L 15/22 |
| | | | | 704/254 |
| 2013/0034303 A1 | 2/2013 | Morwing et al. | | |
| 2013/0314363 A1 | 11/2013 | Zhen | | |
| 2014/0361983 A1* | 12/2014 | Dolfing | .............. | G06F 3/04883 |
| | | | | 345/156 |

OTHER PUBLICATIONS

Kienzle et al., "Writing Handwritten Messages on a Small Touchscreen", MobileHCI 2013—Proceedings of the 15th International Conference on Human—Computer Interaction with Mobile Devices and Services, Aug. 27, 2013.

Lv, Yan-Fei, et al. "Learning-Based Candidate Segmentation Scoring for Real-Time Recognition of Online Overlaid Chinese Handwriting." Document Analysis and Recognition (ICDAR), 2013 12th International Conference on. IEEE, 2013. 7 pages.

* cited by examiner

PARTIAL OVERLAP AND DELAYED STROKE INPUT RECOGNITION

CROSS-REFERENCE TO RELATED APPLICATION

This application is a continuation of U.S. application Ser. No. 14/107,007, filed on Dec. 16, 2013, the contents of which are incorporated by reference.

BACKGROUND

In typical handwriting recognition systems, a computer may receive and interpret intelligible handwritten input from sources such as paper documents, photographs, touch-screens and other devices. Among various recognition techniques, a complete handwriting recognition system also handles formatting, performs correct segmentation into characters and finds the most plausible words. However, such techniques may not perform well when recognizing handwriting input using a user device with limited screen space.

BRIEF SUMMARY

According to implementations of the disclosed subject matter, a multi-character handwritten input may be received and may contain a plurality of strokes. A delayed stroke recognizer may be applied to the multi-character handwritten input to generate a first recognition and a delayed stroke recognition score for the first recognition may be generated. An overlapping recognizer may be applied to the multi-character handwritten input to generate a second recognition and an overlapping recognition score may be generated for the second recognition. The delayed stroke recognition score may be compared to the overlapping recognition score and either the first or second recognition may be selected based on the comparison and may correspond to a recognition of the multi-character handwritten input. Both the delayed stroke recognizer and the overlapping recognizer may operate as a combined recognizer such that the multi-character handwritten input is recognized in both variants by a joint recognizer.

Systems and techniques according to the present disclosure may facilitate handwriting recognition. Multiple recognizers (e.g., a delayed stroke recognizer and an overlapping recognizer) may be simultaneously applied to an input and enable handwriting recognition. Additional characteristics, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 4:
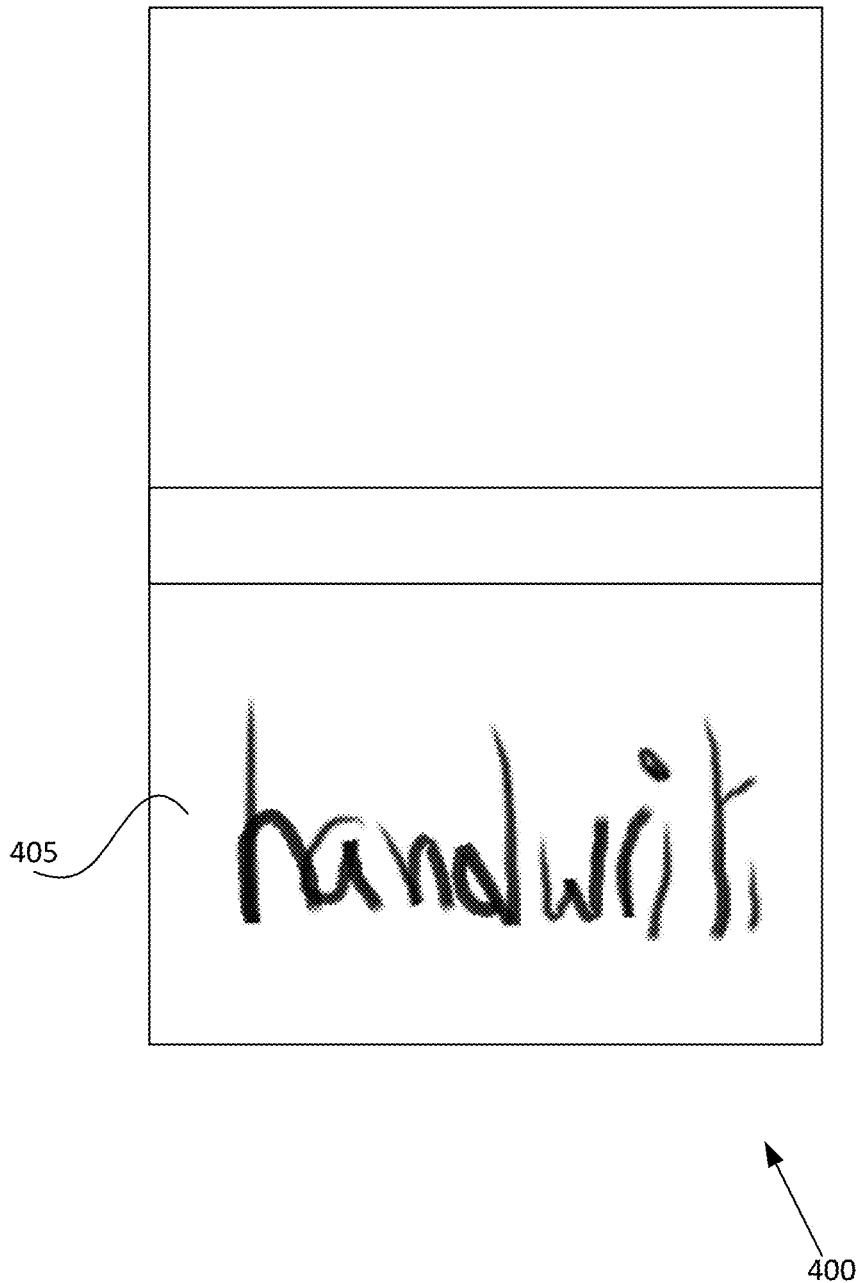
FIG. 4 shows an example handwritten input, according to an implementation of the disclosed subject matter.

Techniques described herein can be applied to online handwriting recognition systems that implement a segment and decode technique for recognizing characters in a script. Typical handwriting recognition systems may experience problems decoding characters, for example because the amount of space available to receive a user input is limited. As shown in FIG. 4, a user using a mobile device 400 may intend to input the word "handwriting" via the input portion 405 of the mobile device 400. However, due to the limited space, the user may not be able to complete the word "handwriting". Here, "online" refers to receiving input from a recorded sequence of positions of pen or finger (in contrast to offline recognition, where the input is a photograph or scanned image, such as in optical character recognition (OCR)). In particular, online handwriting recognition involves the automatic conversion of handwriting as it is written in a handwriting input area on a device, where a sensor picks up the pen-tip movements as well as pen-up/pen-down switching. This kind of data is known as digital ink and can be regarded as a digital representation of handwriting. The obtained signal is converted into letter codes which are usable within computer and handwriting-processing applications. Further, a user may provide online handwritten input using delayed strokes or an overlapping manner, as disclosed herein. It may be difficult to determine the best recognition associated with the user input without information about which input manner in which the user provides the handwritten.

Figure 5A:
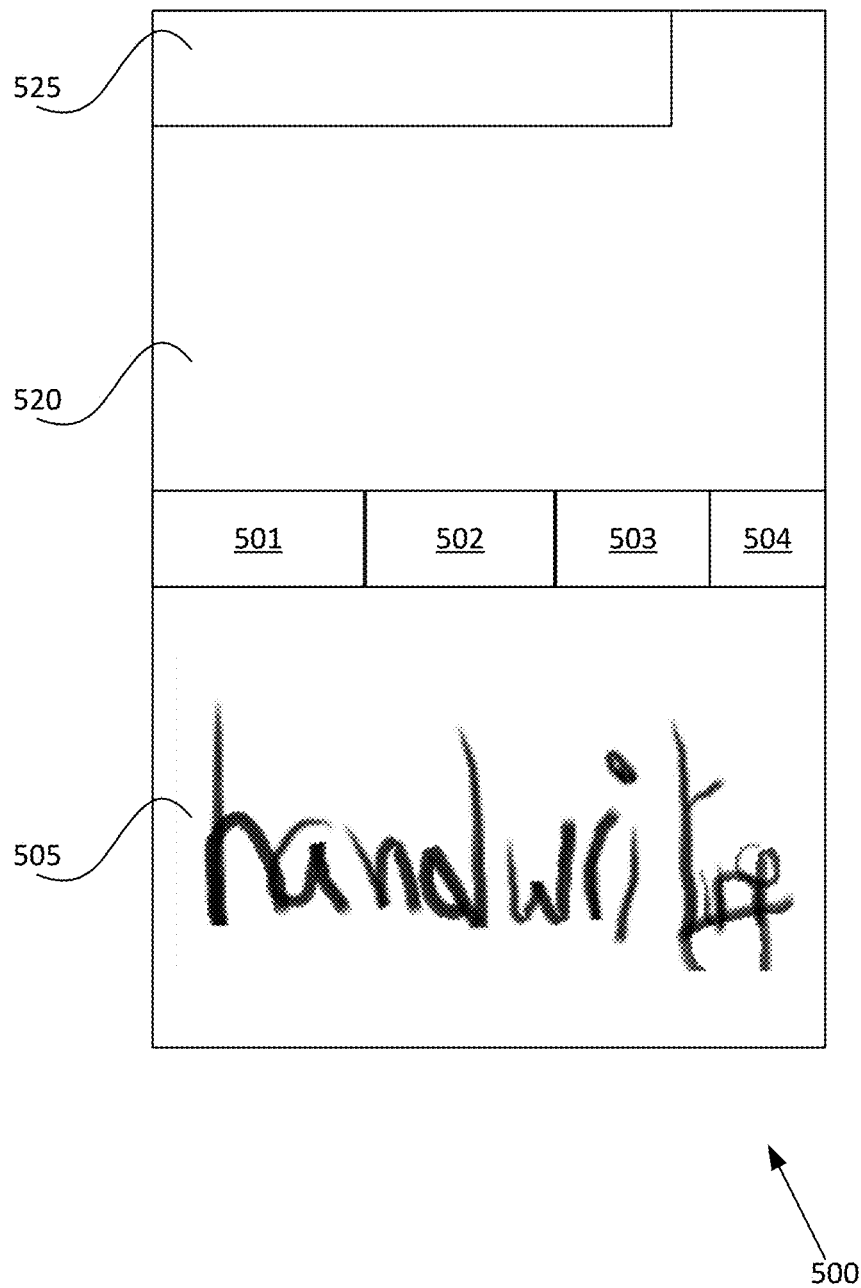
FIG. 5a shows another example handwritten input, according to an implementation of the disclosed subject matter.

According to implementations of the disclosed subject matter, online handwritten input may be provided by any applicable manner. As an illustrative example, as shown in FIG. 5a, a mobile device 500 may contain an input section 505. The input section may be the only input section on the mobile device or may be a portion of the overall input sections on the mobile device. For example, the input section may be a portion or the entirety of a touch-sensitive surface, or may be a specially-designated region of the device that is configured for handwritten input. Mobile device 500 may also contain a recipient section 525 that may provide recipient contact information (e.g., electronic mail address, telephone number alias, etc.). Mobile device 500 may also contain a text preview section 520 that provides a user with a preview of input handwriting (e.g., previously input handwriting, currently typed handwriting, predicted handwriting, etc.). Additionally, text predictions 501, 502, 503, and 504 may be displayed and selectable such that a user may select one of the text predictions either prior to completing input of the handwriting or after completing input of the handwriting.

As shown in FIG. 5a, a user may input "handwrit" and may run out of space on the user device such that the user cannot complete providing the input for "handwriting". Here, the user may overlap the "ing" portion of the input for "handwriting".

Figure 5B:
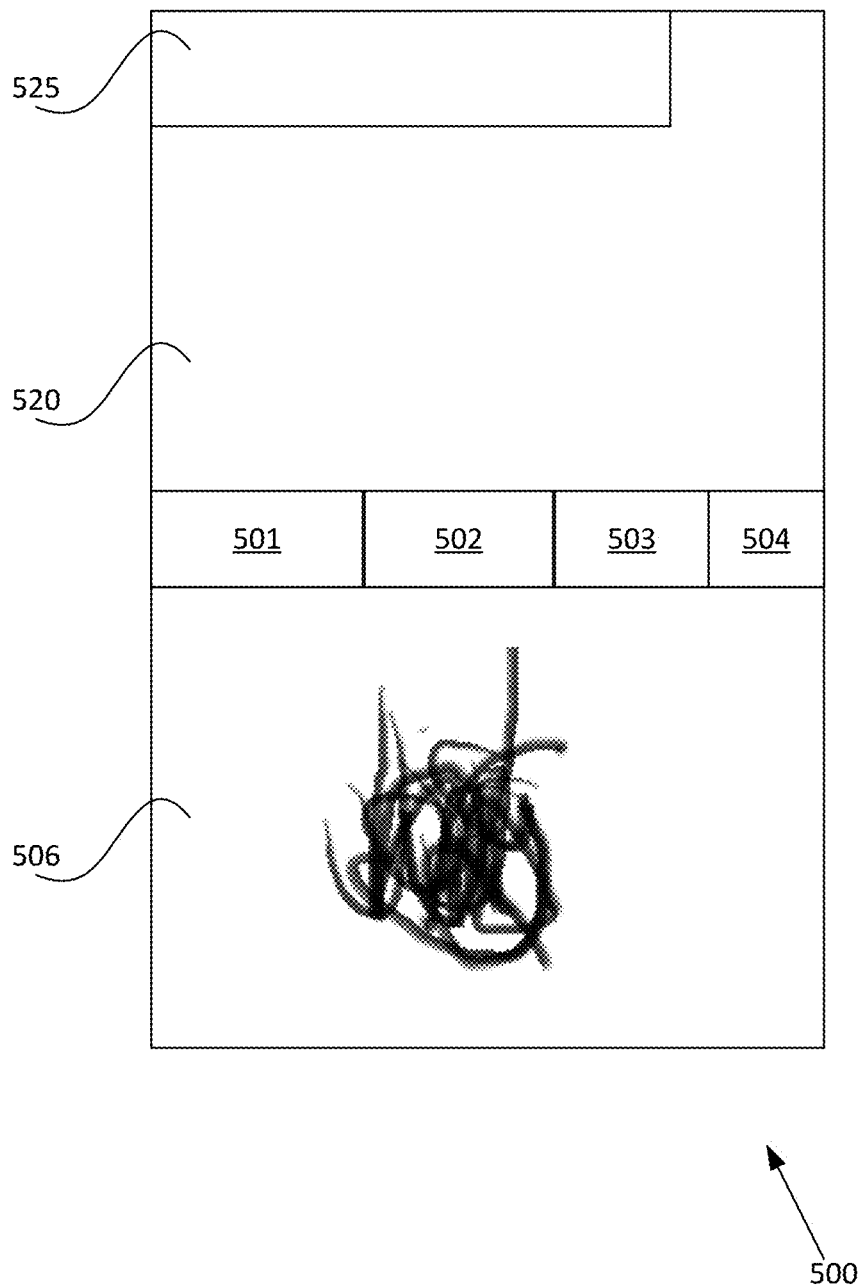
FIG. 5b shows another example handwritten input, according to an implementation of the disclosed subject matter.

As shown in FIG. 5b, a user may input "handwriting" such that each letter in the word is overlapped. The user may input the letters "h", "a", "n", "d", "w", "r", "i", "t", "i", "n", "g" directly over each other (or substantially over each other) such that a limited portion of the input section 506 of the mobile device is required to receive the input.

Figure 5C:
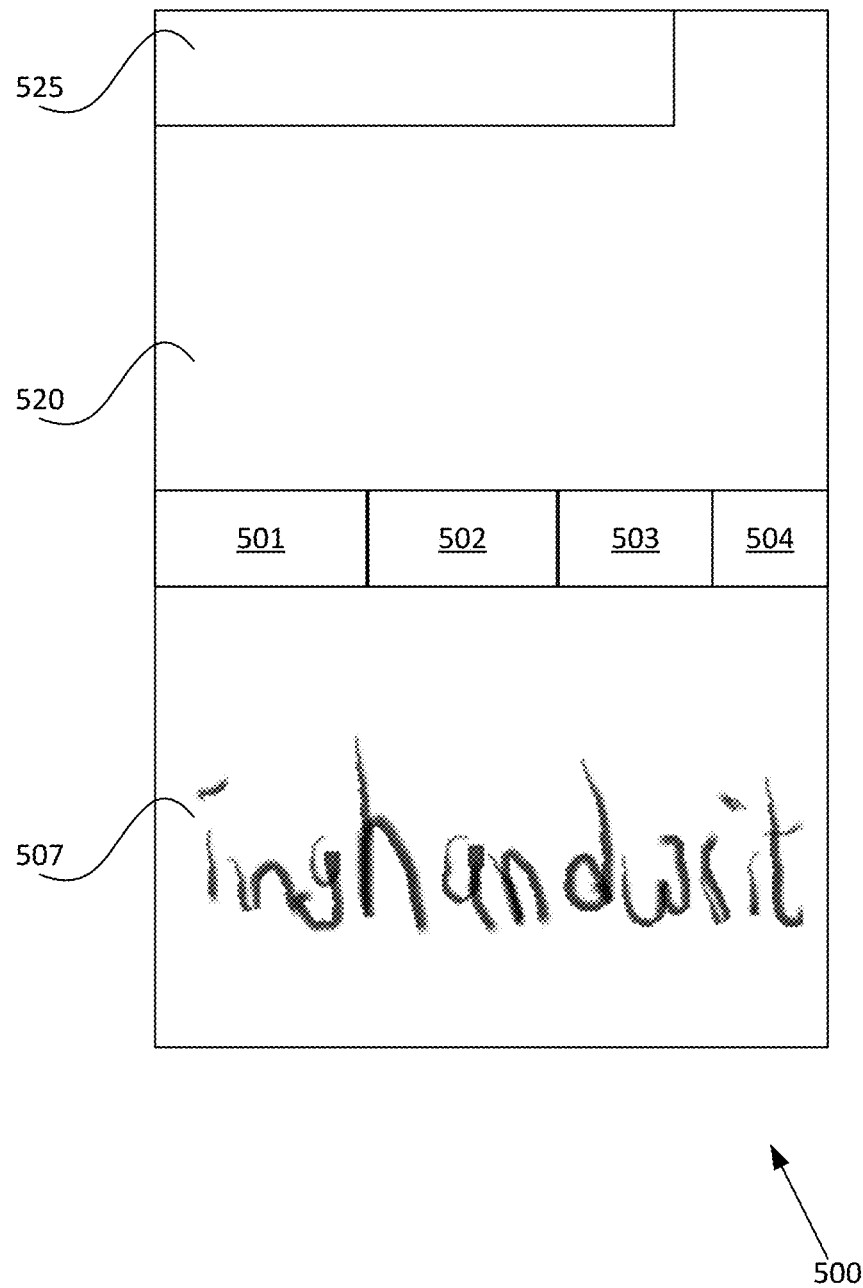
FIG. 5c shows another example handwritten input, according to an implementation of the disclosed subject matter.
Figure 5D:
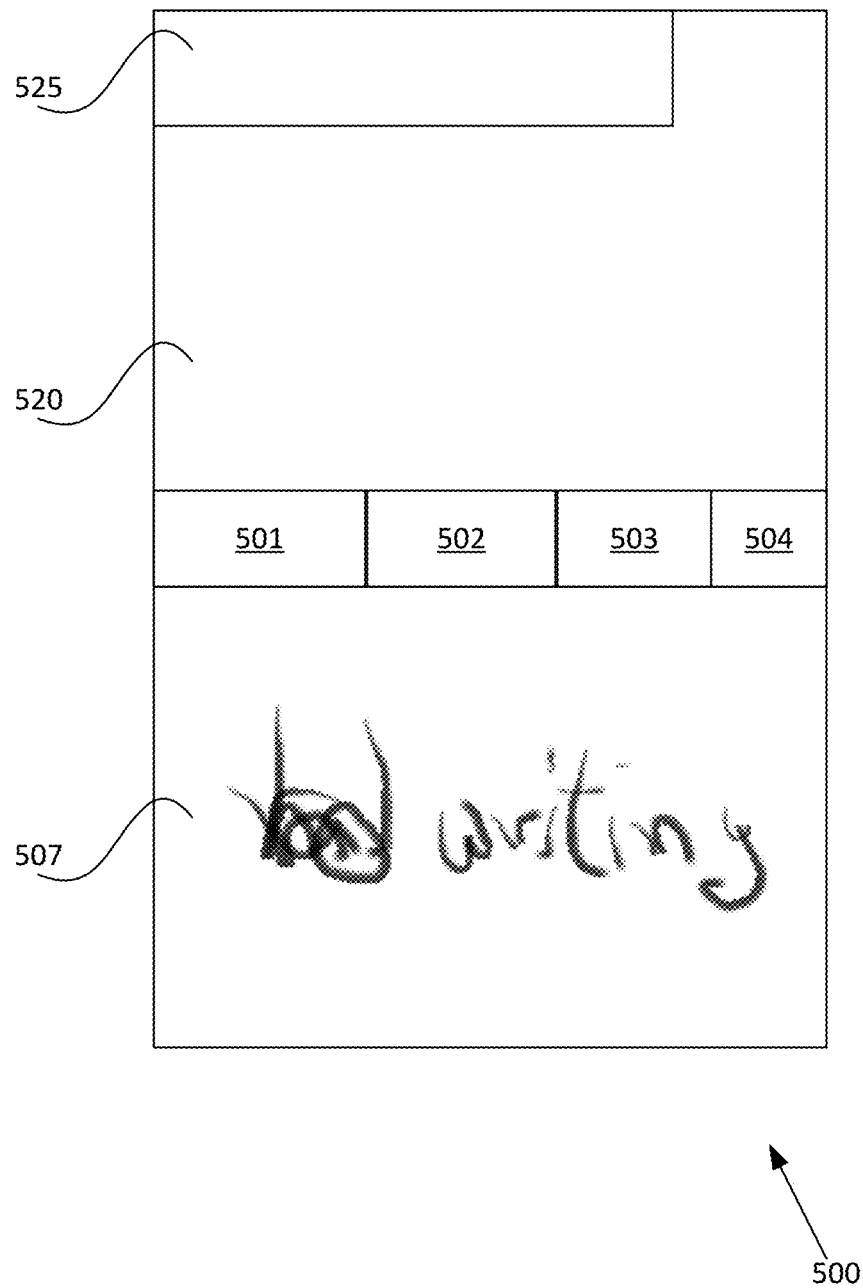
FIG. 5d shows another example handwritten input, according to an implementation of the disclosed subject matter.

A user may input the "handwriting" such that at least a portion of the input is out of order. As shown in FIG. 5c, the handwritten input may be horizontally out of order such that the user may input the letters "handwrit" and may no longer have space to input the remaining "ing" directly adjacent to the already input "handwrit". Here, the user may input the remaining "ing" at the left hand portion of the input section 506 such that the "ing" is input to the left of the input "handwrit". Thus, the "ing" portion of the input may be provided after "handwrit" in time, but may appear spatially before "ing", i.e., out of order relative to the order in which the portions are provided in time.

Figure 5E:
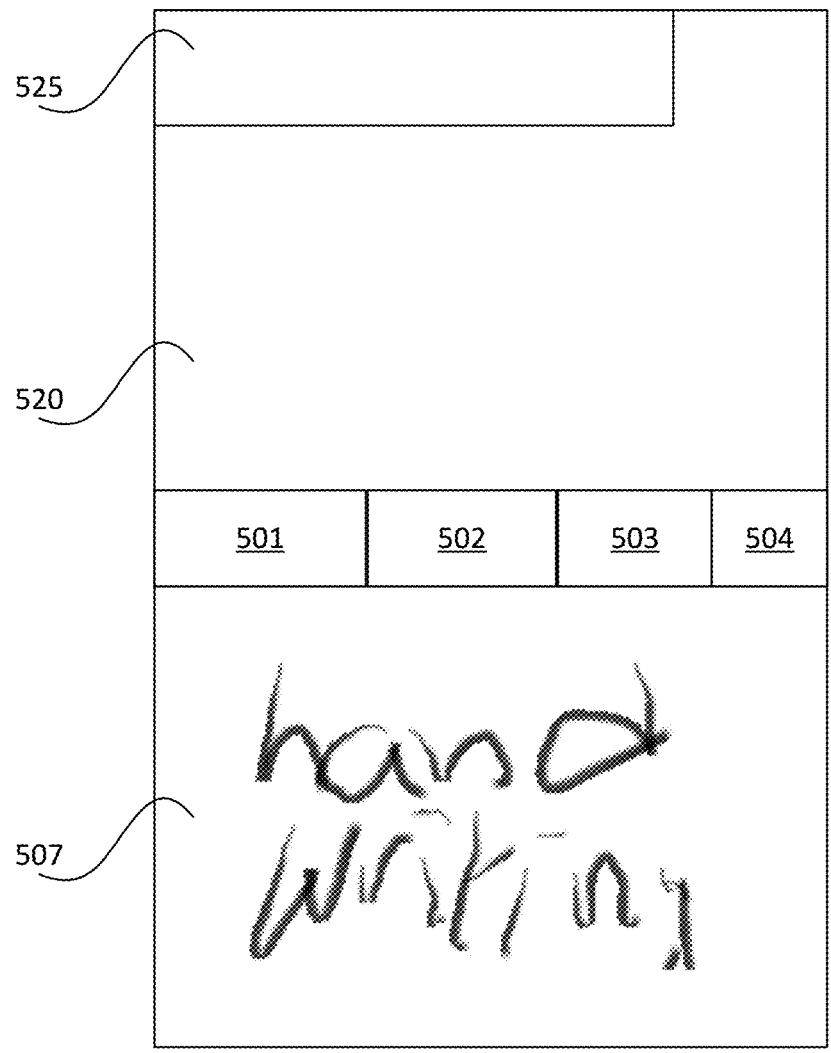
FIG. 5e shows another example handwritten input, according to an implementation of the disclosed subject matter.

As shown in FIG. 5e, a user may input "handwriting" such that at least a portion of the input is vertically separate from at least another portion of the input. As shown, the user may input the letters "hand" at a first vertical position and "writing" at a second vertical position beneath the first vertical position.

Figure 6A:
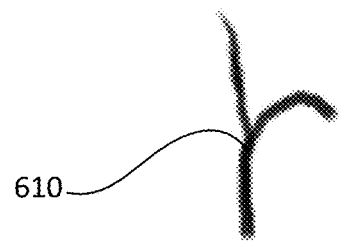
FIG. 6a shows an example partial handwritten input, according to an implementation of the disclosed subject matter.
Figure 6B:
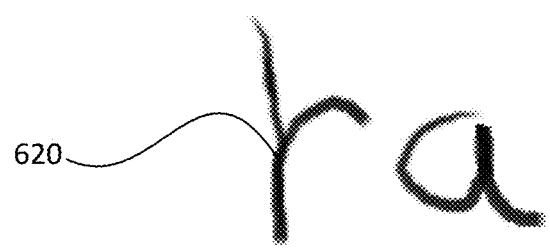
FIG. 6b shows another example partial handwritten input, according to an implementation of the disclosed subject matter.
Figure 6C:
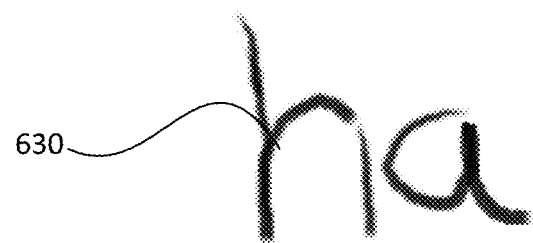
FIG. 6c shows an example corrected partial handwritten input, according to an implementation of the disclosed subject matter.

According to an implementation of the disclosed subject matter, handwriting input containing delayed strokes may be provided. A delayed stroke may be any out of order stroke, such that the stroke is not provided in the order that a letter associated with the stroke appears in the word. A delayed stroke may be any applicable delayed input such as diacritical marks such as a dot on the letter "i" or a bar on the letter "t". Additionally, a delayed stroke may be the result of a correction made to a previously input letter such as to make the letter more legible. As an illustrative example, as shown in FIG. 6a, a user may input the letter "h". However, the input may not be complete such that a portion of the letter "h" 610 may be missing or interpreted as the letter "r". The user may continue to input a subsequent letter "a" 620, as shown in FIG. 6b. As shown in FIG. 6c, the user may correct the originally incomplete "h" 610 such that the "h" is complete at 630. Notably, the correction to the "h", as shown in FIG. 6c, occurred after the input for the "a" was provided by the user, as shown in FIG. 6b.

A delayed stroke may be provided immediately after a main portion of a character has been input or, alternatively, may be provided after an entire word or a portion of the word has been completed. As shown in FIGS. 5a-5e, delayed strokes may be combined with different input factors such as out of order inputs, partially or completely overlapped inputs, vertically separate inputs, or the like. According to an implementation, multiple strokes in a handwritten input may be ordered based on their physical location such that delayed strokes are implicitly grouped with their base character.

According to an implementation of the disclosed subject matter, a delayed stroke may be recognized based on positional information associated with the provided handwritten input. Information regarding handwritten input may be stored for given period of time such that information corresponding to a previously input handwriting may be stored. The period of time may be determined based on a predetermined amount (e.g., 4 seconds), based on user history (e.g., how fast a user generally inputs handwriting), based on a user-provided handwriting input speed, based on the current input itself (e.g., if the user has taken a break from inputting the handwriting, then the arrangement may determine that the current word has been provided and may, subsequently, end the storage time period). The positional information may be stored in any applicable manner such as virtual memory, RAM, ROM, flash RAM, cache, or the like.

Positional information associated with a handwritten input may include identifiers or coordinates corresponding to portions of an input area. For example, if a user inputs the word "desk", then the positional information associated with the input "desk" may contain information describing the absolute position of each individual letter (i.e., "d", "e", "s", "k"), describing where the letters are located relative to each other, where the letters were written relative to the input area, where a given letter begins, where a given letter ends, or the like. Accordingly, if a delayed stroke is provided by a user, then the stored positional information may enable the arrangement to determine which character that delayed stroke corresponds to. As an illustrative example, as shown in FIG. 6a, an incomplete letter "h" may be input. Positional information corresponding to the input letter "h" may be stored and, subsequently, in FIG. 6b letter "a" may be provided. Subsequently, as shown in FIG. 6c, the user may provide a corrective input to complete the letter "h". The corrective input may be associated with the incomplete letter "h" of FIG. 6a based on matching the corrective input with the stored positional information. As a specific example, relative or absolute coordinates may be stored for each endpoint of the partial "h" provided at 610, and/or coordinates may be stored that describe the input region encompassed by the partial "h", such as a rectangle within which the partial "h" occurs. It may be determined that the completion stroke provided at 630 falls within the rectangle defined by the partial "h", and/or that the coordinates of the initial endpoint of the completion stroke are substantially the same as one of the endpoints of the partial "h", thus indicating that the completion stroke is a delayed stroke associated with the partial and completed "h".

According to an implementation of the disclosed subject matter, a user may provide overlapping handwriting by continuously writing characters or parts of words over approximately the same area of the screen (i.e., on top of each other) without having to wait for a timeout between character input and without having to select a button or provide another input indicating the character is complete before entering input for another character. Overlapping handwriting may be detected in any applicable manner such as based on time (e.g., an amount of delay between separate characters may be predetermined or dynamically determined based on a user, language, device, program, etc.), positional information (e.g., when input is provided at the same or similar area of a screen as that of a previous input), user history, or the like. The arrangement may detect each letter that is input as a separate character and determine the end of a word based on any applicable criteria such as a break in input, a change in input location, or the like.

According to implementations of the disclosed subject matter, at least two recognizers may operate in parallel (e.g., the two recognizers operate as a joint recognizer using two variant techniques for recognition); a delayed stroke recognizer and an overlapping recognizer. The delayed stroke recognizer may be configured to generate recognitions and/or prediction scores based on a delayed stroke input. For example, as shown in FIG. 5a, a user may input "handwriting" such that the "ting" portion of the word "handwriting" is provided after the first "i" in the word, "handwriting". The delayed stroke recognizer may recognize that a dot placed over the location of the first "i", after the major portions of each character in the word has been provided, corresponds to the first "i". Accordingly, the delayed stroke recognizer may generate a word recognition based on detecting the delayed stroke. Either the recognizer or a different component may provide a delayed stroke recognition score for the recognition provided by the delayed stroke recognizer. The delayed stroke recognition score may be based on any applicable factor, combined with a detected delayed stroke input, such as the probability that the recognition corresponds to the provided input, the number of occurrences of the recognition (e.g., known to the arrangement, by the user, by users of the respective application), or the like. Similarly, the overlapping recognizer may generate a word recognition based on detecting an overlapping input. Either the recognizer or a different component may provide an overlapping recognition score for the recognition provided by the overlapping recognizer. The overlapping recognition score may be based on any applicable factor, combined with a detected overlapping input, such as the probability that the recognition corresponds to the provided input, the number of occurrences of the recognition (e.g., known to the arrangement, by the user, by users of the respective application), or the like. Here, overlapping input may generally contain characters that are provided at once such that a user provides all the components to the character at once. For example, the dot for an "i" is provided directly after the main portion of the "i" is provided. Similarly, diacritics or the bar on a "t" is provided directly after the main portion of the "t" is provided. Accordingly, overlapping inputs may not require a delayed stroke based analysis.

As disclosed herein, a delayed stroke recognizer and an overlapping recognizer are provided the same multi character handwritten input data such that they operate as a two part overall recognizer. Essentially, a delayed stroke recognizer and an overlapping recognizer may share computation such as feature extraction (e.g., a word property, a character property, a space, an underline, italic, a bolding, character recognition, etc.), partial recognition (e.g., of a handwritten input such as a curve, line, etc.), application of a language model (e.g., applying a machine learned language model to the recognized input received form a user). As an example, the arrangement may receive the handwritten input shown in FIG. 6a and both the delayed stroke recognizer and overlapping recognizer may utilize a single application of a machine learned character model to identify the input 610 as an "h". Essentially, the recognizers share resources (e.g., components that facilitate analysis of multi-character handwritten input) such that the techniques disclosed herein are performed in an efficient manner. Here, a single umbrella recognizer may implicitly allow both interpretations of the multi-character handwritten input (i.e., the delayed stroke ordering and the temporal ordering).

Figure 7:
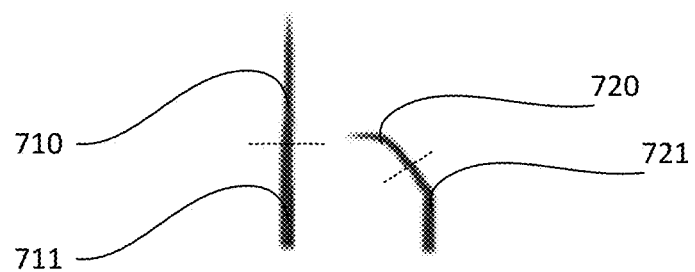
FIG. 7 shows example sub-strokes, according to an implementation of the disclosed subject matter.

According to implementations of the disclosed subject matter, an input stroke may be segmented into sub-strokes, each of which is part of a stroke that is part of a character. As an example, as shown in FIG. 7, a user input of the letter "h" may contain four sub-strokes, a first stroke 710, a second stroke 711, a third stroke 720, and a fourth stroke 721. A delayed stroke recognizer may process the sub-strokes such that the sub-strokes are reordered according to their horizontal spatial location. Alternatively, the overlapping recognizer may process the sub-strokes in their original order. A sub-stroke id may be associated with one or more sub-strokes that have been processed by a recognizer. Notably, the sub-stroke ids may be uniformly assigned such that both the delayed stroke recognizer and the overlapping recognizer utilize the same sub-strokes. The unified representation may allow the two part overall recognizer to run more quickly by allowing tasks to be shared between the two recognizers.

Figure 8:
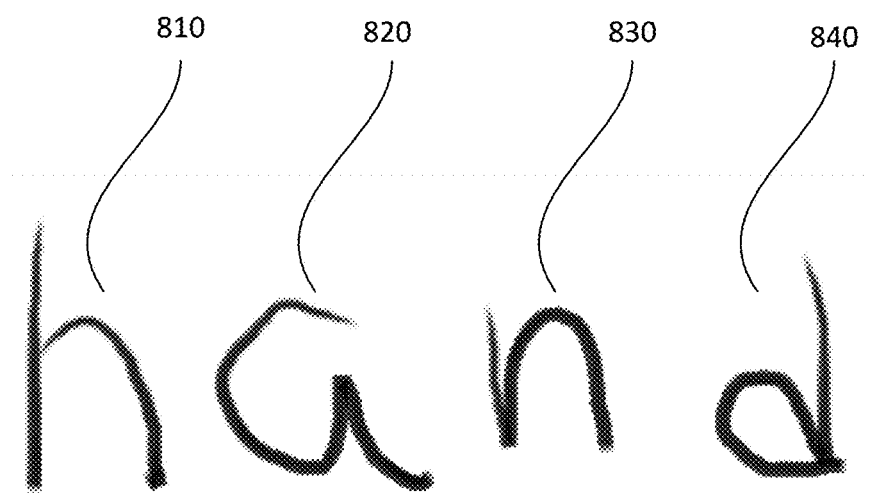
FIG. 8 shows an example handwritten input, according to an implementation of the disclosed subject matter.

As an illustrative example, a user may provide the input, such that the input spatially lays out the word "hand", as shown in FIG. 8. The input may be provided in a time order such that the "a" 820 is provided first, followed by "h" 810, then "n" 830, and finally "d" 840. A recognizer used to recognize the input text may contain a delayed input component (recited as a "delayed input recognizer" for this example) and an overlapping recognizer component (recited as an "overlapping recognizer" for this example). Essentially, the overall recognizer may receive handwritten input and can interpret this input in multiple ways at the same time, using the delayed stroke input path, using the overlapping input path, and using combinations of these for parts of the input. Both paths may be present in the same lattice, such that a single search considers both interpretations at the same time, selecting the best combination of parts of these paths. Additionally, feature extraction and classification may be applied to each input only once and the results may be used at multiple locations in a lattice, for efficiency. The overlapping recognizer may process the input and build the following lattice, based on the time order:

()—a-->(1)---h--->(1,2)--n-->(1,2,3)---d--->(1,2,3,4)

The delayed input recognizer may process the input and build the following lattice, based on the spatial order:

()—h-->(2)---a--->(1,2)--n-->(1,2,3)---d--->(1,2,3,4)

Here the letter on each edge illustrates the input composed by that edge such that both lattices start with no input "( )" and end with all four strokes consumed "(1,2,3,4)". Between the start and the end, both recognizers share "(1,2) - - n - - >(1,2,3) - - - d - - - >" such that computation associated with the shared portions as well as the lattice can be shared by both recognizers.

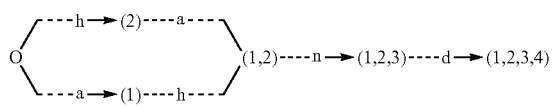

More specifically, both the delayed input recognizer and the overlapping recognizer may utilize the shared portion to, for example, recognize individual characters. Further, the sub-stroke sets that explain the "a" and the "h" are the same in the lower and the upper path of the lattice, effectively merging the two recognizers into a single one. By searching the best path in this lattice, the combined recognizer may create one recognition result. Therefore, this information may also be shared between the two recognizers. Note that although this specific example is not shown with the words overlapping for clarity, the same technique would apply if all or part of the input was overlapping. Continuing the example, a delayed stroke recognizer and an overlapping recognizer may be applied to the input. The delayed stroke recognizer may generate a recognition "hand" with a 0.98 score such that it is 98% certain that the generated recognition "hand" is a correct recognition. The overlapping recognizer may generate recognition "and" with a 0.44 score such that it is 44% certain that the generated recognition "and" is a correct recognition. The 0.98 of the delayed stroke and the 0.44 of the overlapping stroke may be compared and the delayed stroke score of 0.98 may be selected as it is higher. Alternatively, the arrangement may not hypothesize the overlapping recognizer result based on any applicable factor such as a high score from the delayed stroke recognizer, a low score from the overlapping score recognizer, or the like. Accordingly, the delayed stroke recognition "hand" may selected and presented and or provided to a user device. More specifically, the two lattices shown above may be created and then combined into a single lattice that is decoded. The decoding may identify the optimal path in the lattice such that the optimal path is the temporal order or the delayed stroke order. According to implementations, the optimal path may be a partial delayed stroke order and a partial temporal order such that a portion of the input is recognized optimally via the delayed stroke recognizer component and a different portion is recognized optimally via the overlapping temporal order.

Figure 3A:
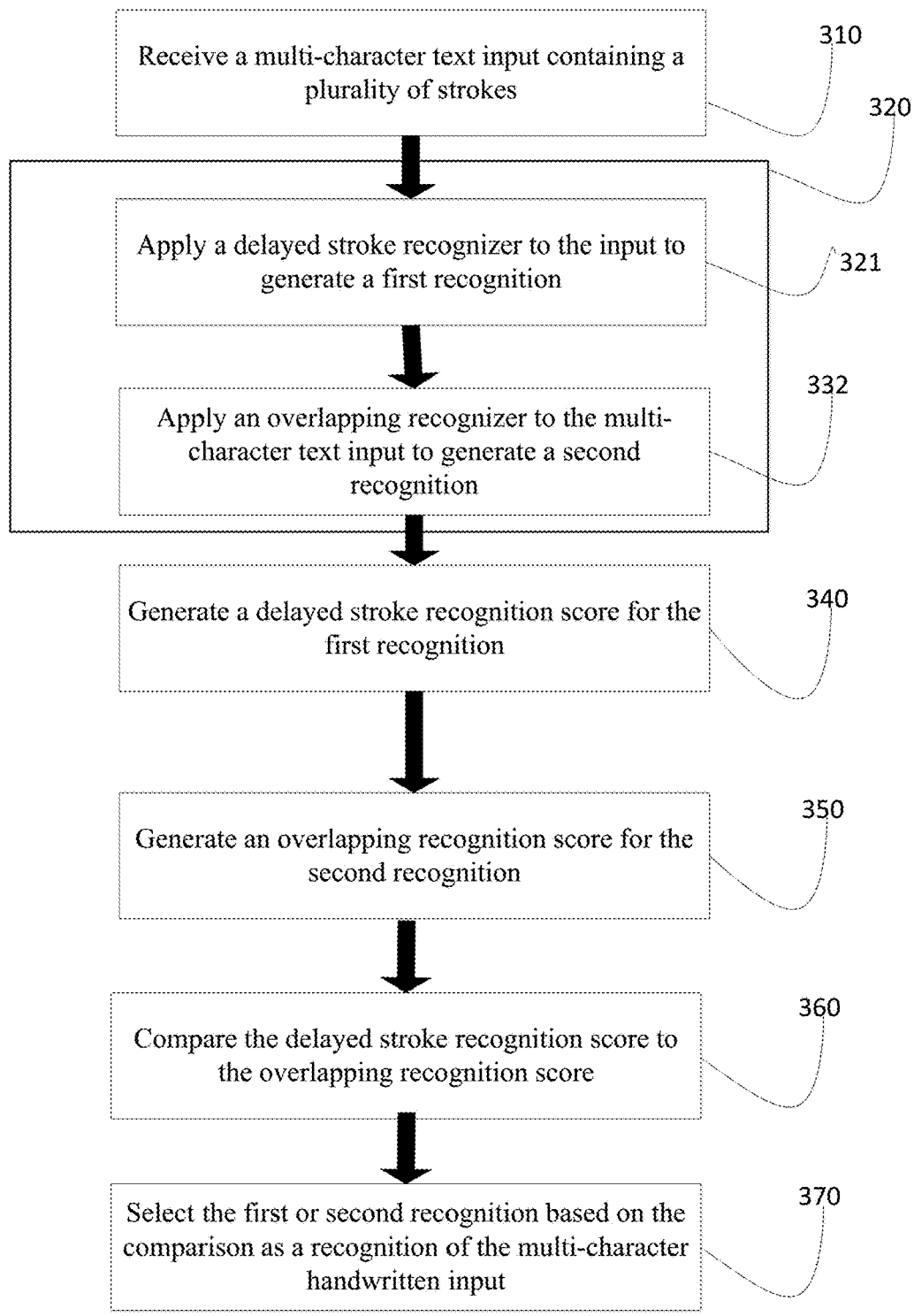
FIG. 3a shows an example illustration of selecting handwriting recognition, according to an implementation of the disclosed subject matter.
Figure 3B:
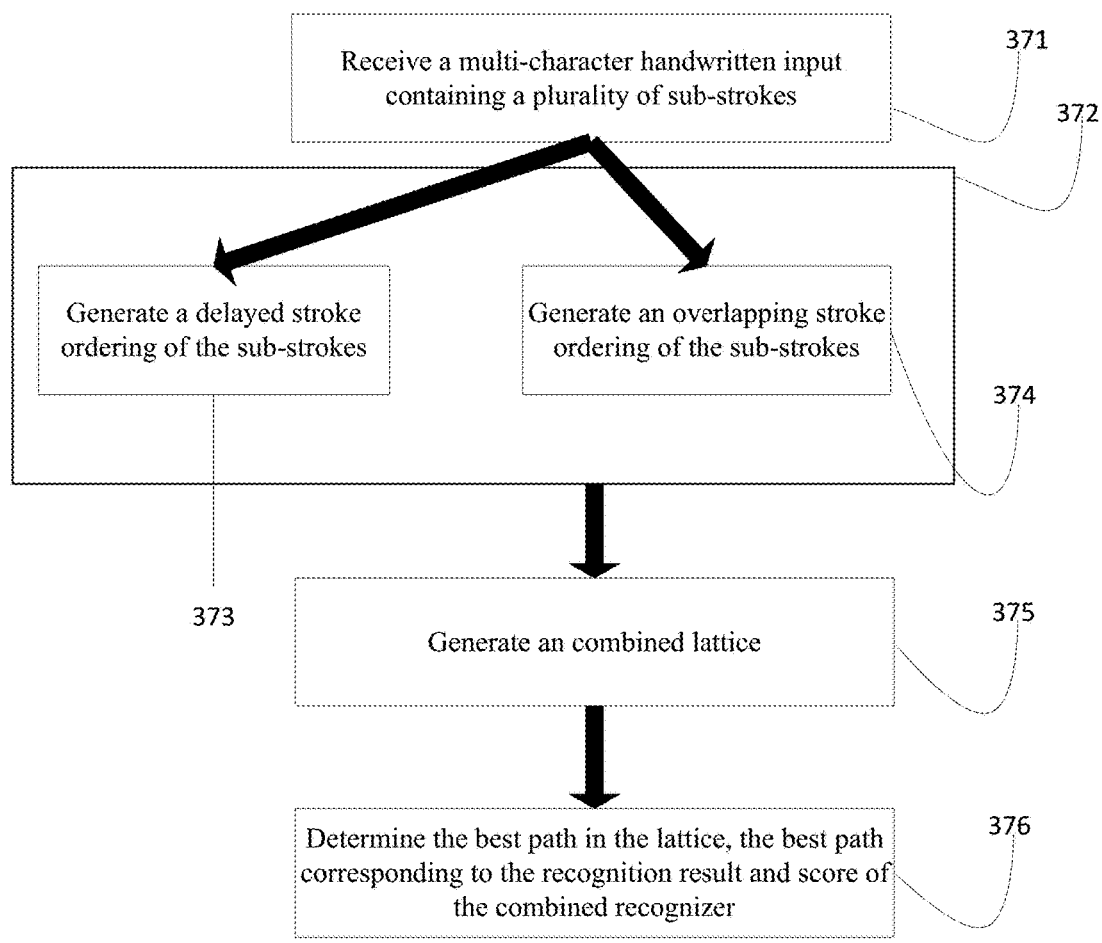
FIG. 3b shows another example illustration of selecting handwriting recognition, according to an implementation of the disclosed subject matter.

According to an implementation of the disclosed subject matter, as shown in FIG. 3a, a multi-character handwritten input containing a plurality of strokes may be received at 310. The input may be received in any applicable manner such as a touch input, stylus input motion detection or the like and may be input using any applicable device such as one that contains a touch screen, motion sensor or the like. At 310 a joint delayed stroke and overlapping recognizer may be applied. At 321, a delay stroke recognizer may be applied to the input and a first recognition may be generated. As an example, a user may input the word "handwriting", as shown in FIG. 5a, and the delayed stroke recognizer may generate a first recognition "hand writing" based on the input. At 340, a delayed stroke recognition score may be generated for the first recognition and may be based on any applicable criteria such as a probability or confidence. For example a delayed stroke recognition score for the "hand writing" recognition may be 0.8 such that it reflects an 80% probability that "hand writing" corresponds to the provided input. At 322 an overlapping recognizer may be applied to the multi character handwritten input to generate a second recognition. Continuing the example, the overlapping recognizer may generate a second recognition "handwriting" based on the user input of the word "handwriting", as shown in FIG. 5a. At 350, an overlapping recognition score may be generated for the second recognition and may be based on any applicable criteria such as a probability or confidence. Continuing the example, an overlapping recognition score for the "handwriting" may be 0.94 such that it reflects a 94% probability the recommended "handwriting" corresponds to the provided input. At 360, the delayed stroke recognition score may be compared to the overlapping recognition score and, at 370, the first or second recognition may be selected as recognition of the multi-character handwritten input, based on the comparison. As another illustrative example of the implementation, as shown in FIG. 3b, a multi-character handwritten input containing a plurality of sub-strokes may be received at 371. At 372 a delayed stroke ordering of the sub-strokes may be generated at 373 and, in parallel; an overlapping stroke ordering of the sub-strokes may be generated at 374. Based on the generated orderings, a combined lattice may be generated at 375. A best path in the lattice may be determined at 376 and may correspond to the recognition result (e.g., the recognition of handwritten input that is partially delayed and partially overlapped) and score of the combined recognizer.

Accordingly, techniques disclosed herein allow an input that contains either temporally out of order character inputs, overlapping character inputs, or both may be recognized by simultaneously and efficiently utilizing a delayed stroke recognizer and overlapping recognizer. The delayed stroke recognizer and overlapping recognizer may share computations such as feature extraction, partial recognition, application of a language model, and the like such that the amount of resources required for processing the input may be reduced. Additionally, the delayed stroke recognizer and overlapping recognizer may produce a recognition such that the optimal recognition is selected based on the inherent diversity present in the two recognizers.

Figure 1:
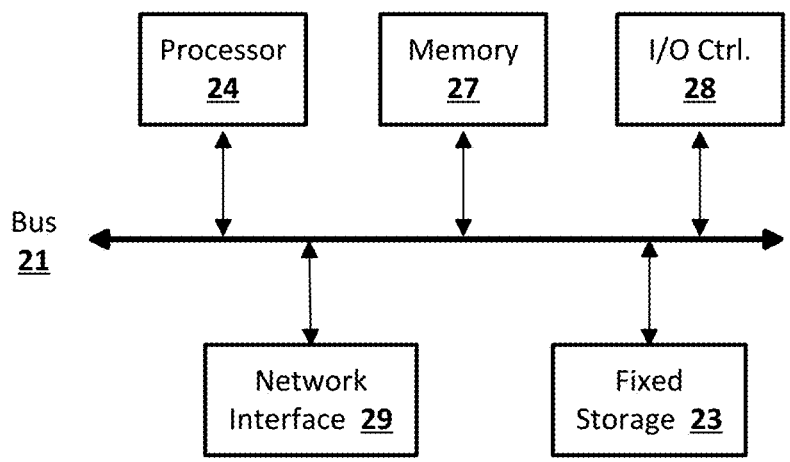
FIG. 1 shows a computer according to an implementation of the disclosed subject matter.

Implementations of the presently disclosed subject matter may be implemented in and used with a variety of component and network architectures. FIG. 1 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 2.

Many other devices or components (not shown) may be connected in a similar manner, such as document scanners, digital cameras, auxiliary, supplemental, or backup systems, or the like. Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 2:
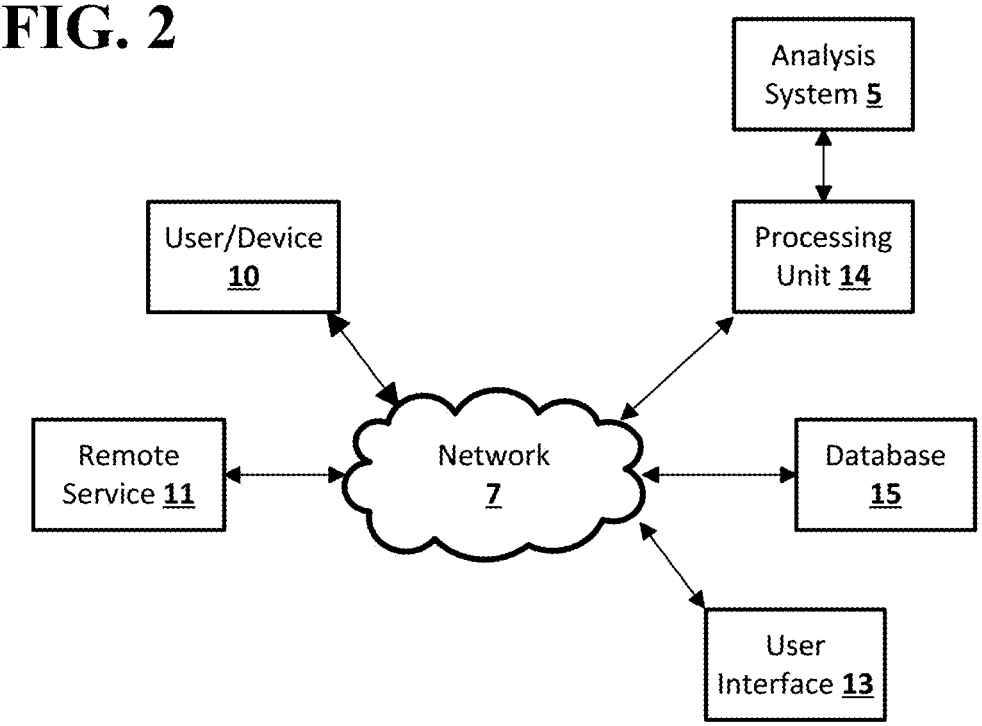
FIG. 2 shows a network configuration according to an implementation of the disclosed subject matter.

FIG. 2 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method for processing handwritten strokes, comprising:
   receiving a sequence of strokes that represent a multiple-letter handwritten input;
   generating a lattice of alternative paths that each include all of the strokes, wherein the alternative paths in the lattice include the strokes in different orders, each edge in the lattice is associated with a letter recognized between strokes represented by two nodes joined by the edge in the lattice, each node in the lattice represents strokes consumed in recognizing letters up to the letter represented by the edge entering the node in the lattice, the lattice has a last node that represents all the strokes in the sequence of strokes, and each alternative path through the lattice represents a respective sequence of letters; and
   selecting the sequence of letters represented by one of the paths through the lattice as the letters corresponding to the multiple-letter handwritten input.

2. The method of claim 1, wherein:
   the alternative paths through the lattice all include at least one common edge and two common nodes.

3. The method of claim 2, wherein:
   selecting the sequence of letters comprises selecting a path in the lattice having a highest confidence score for the associations of letters with edges in the path.

4. A system comprising:
   one or more computers and one or more storage devices storing instructions that are operable, when executed by the one or more computers, to cause the one or more computers to perform operations comprising:
   receiving a sequence of strokes that represent a multiple-letter handwritten input;
   generating a lattice of alternative paths that each include all of the strokes, wherein the alternative paths in the lattice include the strokes in different orders, each edge in the lattice is associated with a letter recognized between strokes represented by two nodes joined by the edge in the lattice, each node in the lattice represents strokes consumed in recognizing letters up to the letter represented by the edge entering the node in the lattice, the lattice has a last node that represents all the strokes in the sequence of strokes, and each alternative path through the lattice represents a respective sequence of letters; and
   selecting the sequence of letters represented by one of the paths through the lattice as the letters corresponding to the multiple-letter handwritten input.

5. The system of claim 4, wherein:
   the alternative paths through the lattice all include at least one common edge and two common nodes.

6. The system of claim 5, wherein:
   selecting the sequence of letters comprises selecting a path in the lattice having a highest confidence score for the associations of letters with edges in the path.

7. A computer program product, encoded on one or more non-transitory computer storage media, comprising instructions that when executed by one or more computers cause the one or more computers to perform operations comprising:
   receiving a sequence of strokes that represent a multiple-letter handwritten input;

generating a lattice of alternative paths that each include all of the strokes, wherein the alternative paths in the lattice include the strokes in different orders, each edge in the lattice is associated with a letter recognized between strokes represented by two nodes joined by the edge in the lattice, each node in the lattice represents strokes consumed in recognizing letters up to the letter represented by the edge entering the node in the lattice, the lattice has a last node that represents all the strokes in the sequence of strokes, and each alternative path through the lattice represents a respective sequence of letters; and selecting the sequence of letters represented by one of the paths through the lattice as the letters corresponding to the multiple-letter handwritten input.

8. The computer program product of claim 7, wherein:
the alternative paths through the lattice all include at least one common edge and two common nodes.

9. The computer program product of claim 8, wherein:
selecting the sequence of letters comprises selecting a path in the lattice having a highest confidence score for the associations of letters with edges in the path.

\* \* \* \* \*